(12) United States Patent
Lagares Corominas

(10) Patent No.: US 6,878,274 B2
(45) Date of Patent: Apr. 12, 2005

(54) DEVICE FOR FILTERING FLUID SUBSTANCES USED FOR MEAT MATERIALS INJECTING MACHINES

(75) Inventor: Narcís Lagares Corominas, Girona (ES)

(73) Assignee: Metalquimia, S.A., Girona (ES)

( * ) Notice: Subject to any disclaimer, the term of this patent is extended or adjusted under 35 U.S.C. 154(b) by 0 days.

(21) Appl. No.: 10/264,270

(22) Filed: Oct. 4, 2002

(65) Prior Publication Data

US 2003/0089655 A1 May 15, 2003

Related U.S. Application Data

(63) Continuation of application No. PCT/ES00/00127, filed on Apr. 7, 2000.

(51) Int. Cl.[7] .............................................. B01D 29/96
(52) U.S. Cl. ..................... 210/335; 210/259; 210/323.2; 210/341
(58) Field of Search ................................ 210/124, 171, 210/234, 253, 255, 257.1, 259, 261, 262, 297, 324, 329, 340, 341, 390, 402, 418, 323.1, 323.2, 332, 346, 347; 99/532, 533, 535

(56) References Cited

U.S. PATENT DOCUMENTS

| | | | |
|---|---|---|---|
| 330,145 A | * 11/1885 | Oldham | 210/341 |
| 1,784,103 A | * 12/1930 | Lowen | 210/330 |
| 1,878,998 A | 9/1932 | Akins | |
| 2,568,085 A | * 9/1951 | Naugle | 210/333.01 |
| 2,894,633 A | * 7/1959 | Collins | 210/341 |
| 3,502,220 A | * 3/1970 | Kohlberg | 210/416.1 |
| 3,598,243 A | * 8/1971 | Gutkowski | 210/340 |
| 4,124,507 A | * 11/1978 | Mazzetti | 210/141 |
| 4,478,714 A | * 10/1984 | Blake et al. | 210/136 |
| 5,322,623 A | * 6/1994 | Benskin et al. | 210/195.1 |
| 5,405,630 A | * 4/1995 | Ludwig | 426/231 |
| 2002/0152901 A1 | * 10/2002 | Basile et al. | 99/533 |

FOREIGN PATENT DOCUMENTS

| | | |
|---|---|---|
| ES | 363289 | 2/1971 |
| ES | 8507324 | 12/1985 |
| ES | 8600011 | 1/1986 |
| ES | 2015398 | 8/1990 |

* cited by examiner

Primary Examiner—Matthew O. Savage
(74) Attorney, Agent, or Firm—Jacobson Holman PLLC

(57) ABSTRACT

Device for filtering fluid substances, used for a meat materials injecting machine which comprises a coarse filter (1) provided with means (2) for retaining and withdrawing from a fluid the largest particles, and at least a first and a second fine filters (3a) for retaining the smallest particles remaining in the said fluid prefiltered by the coarse filter. The said fine filters (3a) are mounted in respective supporting means (10a), independent from each other, fastened on selecting means (9a). Each of the said supporting means (10a) can independently adopt a working position in which the said selecting means (9a) allow that the fluid passes through related fine filter (3a) and a cleaning position in which the said selecting means (9a) block the passage of the fluid through related fine filter (3a), which can be dismounted for its cleaning.

7 Claims, 1 Drawing Sheet

DEVICE FOR FILTERING FLUID SUBSTANCES USED FOR MEAT MATERIALS INJECTING MACHINES

This is a continuation of PCT/ES00/00127 filed on Apr. 7, 2000 and published in Spanish.

FIELD OF THE INVENTION

This invention refers to a device for filtering fluid substances, used for a meat materials injecting machine of those comprising a coarse filter provided with means for retaining and withdrawing from a fluid the largest particles and at least a first and a second fine filters for retaining the smallest particles remaining in the said fluid after passing through that coarse filter. Each of the said at leat first and second fine filters are linked to selecting means and can independently adopt a working position, in which the said selecting means allow the fluid to pass through related fine filter towards a sucking outlet, or a cleaning position, in which the said selecting means prevent the fluid passes through related fine filter towards the said outlet.

TECHNICAL BACKGROUND

In the art of the sector different filtering devices are known designed to filter fluid substances coming from meat materials injecting machines. The purpose of the said devices is to conveniently filter the said fluid substances which typically consist in brine, with or without other additives, to condition them so that they can be newly recycled to the injecting machine. The materials which are in suspension in the said fluid substances are from several millimeters thick meat pieces up to microscopic particles. Thus the general strategy of such devices consists in first, passing the fluid through one or more coarse filters and second, passing it through one or more fine filters before it is recycled to the injecting machine.

The main problem to overcome stands in the fact that the filters are gradually clogged by the very particles which are filtered from the fluid. Although for coarse filters this problem is overcome on a nonstop basis by a scraping device and/or pressurised water, up to now, no simple and cheap solution has been found applicable to fine filters without stopping the machine is required.

ES-A-8901853, filed on 2 May 1989 by this applicant, discloses a filtering equipment comprising a first rotatory polyhedral-drum-shaped coarse mesh filter arranged under an inlet of fluid coming from an injecting machine, and a second rotatory cylindrical-drum-shaped fine mesh filter arranged partly submerged in a wrapping tank collecting the fluid coming from the first filter. In an area of the bottom of the said wrapping tank there is a mouth for sucking the fluid through the wall of the said fine mesh filtering drum so that the particles in suspension remain retained on the internal face of the said wall. In an external area emerging from the top part of the said fine mesh drum, there is a cleaning device with pressurised water for the said wall, the said device comprising under the internal face of the said top part, a container for collecting the cleaning water together with the dirtiness preventing that it is mixed with the fluid to be recycled flowing to the injecting machine.

This equipment despite its effectiveness was proven in the practice is complex as for the fine mesh filter cleaning, namely because a rotary drum is required, conveniently driven as well as a cleaning device based on the action of a pressurised fluid which has not to be mixed with the fluid to be filtered. In addition, at relatively long regular periods of time, the cleaning provided by the said automatic device must be completed with a thorough hand cleaning or by means of a machine controlled by an operator.

U.S. Pat. No. 4,622,892, granted on 18 Nov. 1986, discloses a machine for injecting meat materials which incorporates a container with a main filter and a recipient with an auxiliary filter, combined with means for shifting the fluid coming from the injecting machine towards the said container of the said auxiliary filter when it is considered that the main filter has to be cleaned, so that it can be withdrawn for cleaning it by hand or by means of a remote machine, while filtering is carried out through the auxiliary filter. When the main filter is newly operating it is proceeded to clean the auxiliary filter and so on. The outlets of both containers are connected to a pump circulating the fluid, means are provided for commuting the said outlets towards the circulation circuit depending on the filter which is being operated. As well the main as the secondary filters are basket-shaped with flat walls, and an external layer of coarse mesh and an internal layer of fine mesh, adapted to the shape of the containers.

This device allows to clean one of the filters while the other is operating without stopping the machine. However, a hand control of the said means is required for shifting the incoming fluid towards one or the other container as well as from the said means for commuting the outputs thereof towards the circulation circuit to be able to observe the state of dirtiness of the filters and, if it is thought fit, withdraw them for cleaning them.

SHORT DESCRIPTION OF THE INVENTION

The object of this invention is to provide a filtering device for fluid substances, used for a machine injecting meat materials, in which at least fine filters can be withdrawn for their cleaning without having to impair the filtering process and without voluntary action is required on controlling means of a circulation circuit of the said fluid substances.

This object is reached according to this invention by providing a device for filtering fluid substances comprising a coarse filter, provided with means for retaining and withdrawing from the fluid those particles having larger size, and at least a first and a second fine filters for retaining those particles having smaller size remaining in the said fluid after it passes through the said coarse filter. The said coarse filter is a rotary drum which operates by gravity, being arranged under a mouth of supply coming from the injecting machine. A scrapper is tangentially supported on the cylindrical external surface of the drum, pressing against it by means of springs, for withdrawing the large particles retained by the filtering walls of the said drum and directing them to a collecting tray. The coarse filter drum non-stop cleaning is optionally completed by means of a device sprinkling pressurised water on the internal face of the lower part thereof.

The fluid prefiltered by the said rotatory drum is directed being mixed with cleaning water, towards a container in which it is temporarily retained, the said container being provided with means for collecting that fluid towards a sucking outlet. The said first and second fine filters are mounted on respective supporting means, mutually independent, linked to selecting means which selectively allow the fluid to pass at least through the said first fine filter, through the said second fine filter or through both at same time, towards the said collecting means.

Each of the said supporting means can independently adopt a working position in which the said selecting means allow the fluid to go through related first or second fine filter and a cleaning position in which the said selecting means blocks the passage of the fluid through related first and second fine filters and in which related first or second fine filter can be dismounted for being cleaned. The supporting means of the first and second fine filters are fastened to the said selecting means, which, in turn are linked to respective inlets of the said collecting means. The elements are arranged so that, in the said working position, related first or second fine filter is submerged while, in the said cleaning position, the said corresponding first or second fine filter is submerged, at least partly.

Thus, when both filters are in the working position, submerged in the fluid of the said container, the selecting means keep respective sucking inlets of the collecting means open for sucking the fluid through the filtering walls of both fine filters. When one or the other of the first and second fine filters is placed in cleaning position, the travel of its supporting means moves the said selecting means fastened to them which close the passageway for the fluid towards corresponding sucking inlet, without impairing at all the operation of the other fine filter which is located at the working position, and without stopping the machine operation. With the supporting means at the cleaning position, the related fine filter can be dismounted and withdrawn for its cleaning. Respective preferably filtering protecting walls are fixed on the selector bodies and on supporting means and in a wrapping arrangement on an area of the fine filters larger than these later which remains submerged in cleaning position, preventing with it that suspended particles enters in the fluid close to the said passageways when one of the said fine filters is withdrawn for its cleaning, with related supporting means at the said cleaning position.

It must be pointed out that although at least two assemblies of fine filters are required as those above disclosed, the device of the invention is not limited to two fine filters but it can incorporate any greater number of them.

SHORT DESCRIPTION OF THE DRAWINGS

These and other advantages will be more apparent from following detailed description of a preferred example of embodiment, the description of which includes references to drawings attached in which.

DETAILED DESCRIPTION OF A PREFERRED EXAMPLE OF EMBODIMENT

Figure 1:
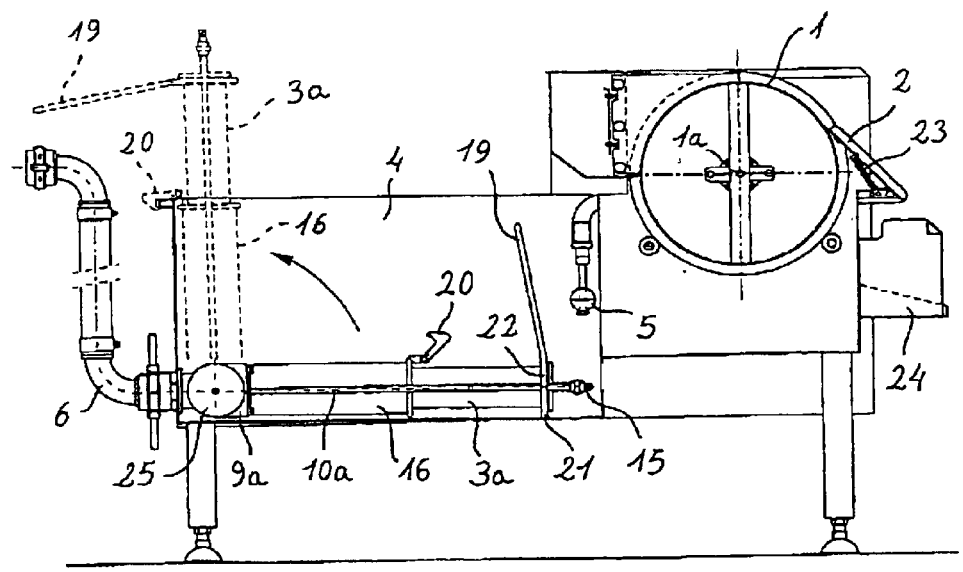
FIG. 1 is a partly sectional side elevation view showing the fluid substances filtering device, used for a meat materials injecting machine of this invention.
Figure 2:
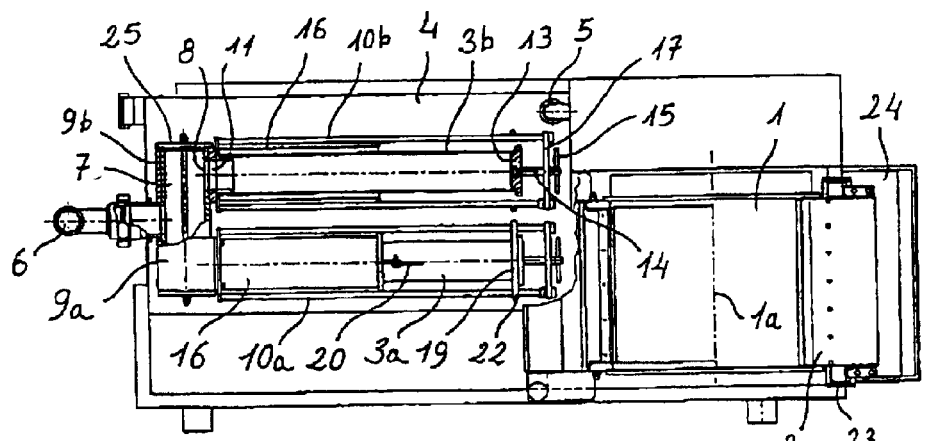
FIG. 2 is a partly sectional plan view of the device of FIG. 1.

Referring first to FIGS. 1 and 2, the filtering device of this invention comprises a drum-shaped coarse filter 1, having a filtering wall mounted so that it can rotate on a horizontal axis 1a. A scraper 2 is tangentially supported on the external surface of the drum and pressed against it by springs 23, for withdrawing from that surface the larger particles retained by the said coarse filter 1 and make them slide towards a collecting tray 24.

The prefiltered fluid coming from the coarse filter 1 passes to a container 4 where it is temporarily retained, the said container 4 being provided with collecting means 7 for the said fluid towards a sucking outlet 6 and buoy means 5 for keeping a constant fluid level within the container 4.

Within the said container 4, there is a first and a second fine filters 3a, 3b for retaining the smaller particles remaining in the said fluid after it passes through the said coarse filter 1, the said fine filters 3a, 3b are mounted on respective supporting means 10a, 10b mutually independent, linked to selecting means 9a, 9b allowing that the fluid selectively passes either through the said first fine filter 3a or through the said second fine filter 3b, or through both of them, towards the said collecting means 7 and towards the said sucking outlet 6. Each of the said supporting means 10a, 10b can independently adopt a working position (represented by a continuous strokes in FIG. 1) in which the said selecting means 9a, 9b allow the passage of the fluid through related first or second filter 3a, 3b and a cleaning position (represented by stroke lines in FIG. 1) in which the said selecting means 9a, 9b block the passage of the fluid through corresponding first or second fine filter 3a, 3b and in which corresponding first or second fine filter 3a, 3b can be dismounted for its cleaning. The operation of the selecting means 9a, 9b is explained below with relation to FIGS. 3 and 4.

The said supporting means 10a, 10b of the first and second fine filters 3a, 3b are fastened to the said selecting means 9a, 9b which, in turn are associated to respective inlets 8 of the said collecting means 7. The arrangement of the elements in the container 4 is such that in the said working position the supporting means 10a, 10b are in a significantly horizontal position and corresponding first or second fine filter 3a, 3b is submerged while, in the said cleaning position, the supporting means 10a, 10b are in a significantly vertical position and corresponding first or second fine filter 3a, 3b is at least partly emerging.

The collecting means 7 comprise at least externally cylindrical walls arranged in horizontal position, in which respective inlets 8 are open, while the selecting means comprise respective selector bodies 9a, 9b with internally cylindrical walls in which passageways 11 are open. These internally cylindrical walls of the selector bodies 9a, 9b are tightly mounted on the said externally cylindrical walls of the collecting means 7 so that they can rotate about themselves guided on the sides by suitable stops 25. In the said working position each of the said selector bodies 9a, 9b communicates its own passageway 11 with respective inlet 8 while in the said cleaning position the selector body 9a, 9b interposes a closing portion 12 of its internally cylindrical position for closing the said inlet 8.

Advantageously, the first and second fine filters 3a, 3b are identical and have the shape of a cylindrical wall, being arranged in radial position with respect to the collecting means 7. Each fine filter 3a, 3b remains trapped between a seat 26, surrounding a centering rim 18 arranged around respective passageway 11 and a respective movable pressing plug 13, mounted at a distal end of respective supporting means 10a, 10b (as it can be seen in the assembly of fine filter 3b of FIG. 2, which is illustrated in longitudinal section). The said pressing plugs 13 are connected to respective spindles 14 driven by handles 15 mounted on crossbars 17 of longitudinal posts of supporting means 10a, 10b. The said crossbars 17 can be withdrawn from a position facing respective fine filters 3a, 3b when the said pressing plugs 13 are not operating. This is achieved, for example, by mounting the crossbar 17 by means of a rotatory anchorage of one of its ends with respect to one of the said longitudinal posts and an open anchorage of the opposite end with respect to the opposite post. Thus, when pressing plug 13 is loosened, crossbar 17 can be pivoted about its rotatory anchorage leaving a free passage for withdrawing or introducing respective fine filter 3a, 3b.

For preventing that particles suspended in the fluid enter close to the said seats 26 and passageways 11 when the said first and/or second fine filters 3a, 3b are withdrawn for their cleaning, with the supporting means 10a, 10b in the said cleaning position, respective protecting filtering walls 16 are fastened to the selector bodies 9a, 9b and supporting means 10s, 10b and externally arranged on at least an area of the first and second fine filters 3a, 3b larger than the part of them which remains submerged when they are in cleaning position.

Supporting means 10a, 10b in addition comprise a reinforcing cross structure 22 which defines, on one side, a supporting foot 21 on a bottom of the said container 4 and which extends by its opposite side, defining a handle 19 which remains emerged when supporting means 10a, 10b are in working position. Locking means 20 are arranged for fastening supporting means 10a, 10b in cleaning position.

Figure 3:
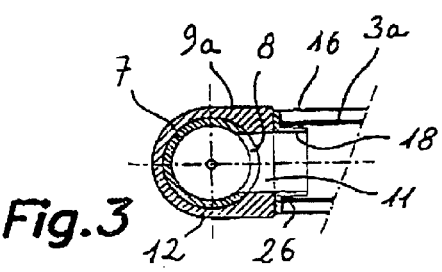
FIG. 3 is a detail in cross section of the area of the collecting means and selecting means in working position.
Figure 4:
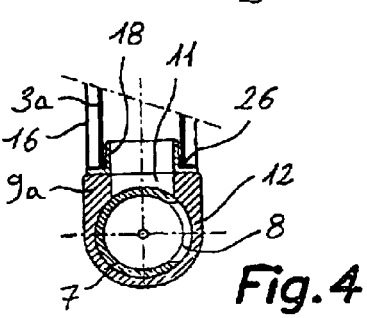
FIG. 4 is a detail in cross section of the area of the collecting means and the selecting means in cleaning position.

Referring now to FIGS. 3 and 4, they illustrate for example purpose the operation of selecting means 9a corresponding to the assembly of the first fine filter 3a although the said illustration would be identical for the assembly of fine filter 3b or for further assemblies of fine filters which could be mounted on longer collecting means.

In FIG. 3, the supporting means (not shown) are horizontally brought down in the said working position (illustrated by continuous strokes in FIG. 1) keeping fine filter 3a together with its related protecting filtering wall 16 submerged in the fluid of container 4. In this working position, passageway 11 of selector body 9a is facing related opening 8 of collecting means 7, which are connected to sucking outlet 6 (see FIGS. 1 and 2) so that the fluid is sucked in order it passes through first fine filter 3a and to a lesser extent through the protecting filtering wall 16, through passageway 11, opening 8 and collecting means 7 up to sucking outlet 6.

On the contrary, in FIG. 4, the supporting means (not shown) are uprightly lifted in mentioned cleaning position (illustrated by stroke lines in FIG. 1), keeping a part of fine filter 3a emerging and the other part submerged, with related protecting filtering wall 16 to a large extent also submerged protecting the areas close to the said seat 26 and passageway 11 from suspended particles penetrating in the fluid of container 4. In this cleaning position, passageway 11 of selector body 9a is facing a blind area of the externally cylindrical wall of collecting means 7, while related opening 8 of collecting means 7 remains closed by a closing portion 12 of related internally cylindrical wall of selector body 9a, therefore mentioned sucking effect does not occur from sucking outlet 6 on the said first fine filter 3a, thus this latter can be dismounted and withdrawn for being cleaned as it is explained above. The said operation is carried out, in this case, while second fine filter 3b is operating with its selecting means 9a in a position analogous to that illustrated in FIG. 3.

It is important to point out that although the invention is illustrated with an embodiment in which there is first and second fine filters 3a, 3b, their number is not limited to two, but a third and more fine filters can be incorporated, mounted on respective independent supporting means fastened on third and more selecting means linked to as many other outlets 8 from collecting means 7 having a suitable length.

What is claimed is:

1. A device for filtering fluid substances, used for a meat material injecting machine, comprising a coarse filter provided with means for retaining and withdrawing from a fluid largest particles to produce pre-filtered fluid and at least a first filter and a second fine filter for retaining smallest particles remaining in said fluid after passing through said coarse filter, selecting means being arranged for selectively allowing said pre-filtered fluid to pass through at least said first fine filter and/or through said second fine filter towards a sucking outlet, wherein:

said first and second fine filters are located within a container provided for temporarily retaining said pre-filtered fluid coming from said coarse filter;

said container is provided with collecting means for collecting and directing said fluid towards the sucking outlet;

said selecting means are associated with respective inlets of said collecting means;

said first and second fine filters are mounted on independent supporting means fastened to said selecting means, each of said supporting means being susceptible to be independently placed in;

a working position, in which said corresponding first or second fine filter is submerged, and said selecting means allow said fluid to pass through said corresponding first or second fine filter; and a cleaning position, in which said corresponding first or second fine filter is emerged at least in part, said selecting means block the passage of said fluid through said corresponding first or second fine filter, and said corresponding first or second fine filter is susceptible to be dismounted for being cleaned; and wherein said collecting means comprise at least one external cylindrical wall arranged in horizontal position in which said inlets are open while said selecting means comprise respective selector bodies having internally cylindrical walls in which passageways are open, the internally cylindrical walls of the selector bodies being tightly mounted on said externally cylindrical wall of said collecting means and susceptible to rotate thereabout, communicating said passage of said corresponding selector body with said respective inlet in said working position and interposing a closing portion of said corresponding internally cylindrical wall for closing said inlet in said cleaning position.

2. The device according to claim 1, wherein said at least first and second fine filters are cylindrical-wall-shaped and are mounted in a radial position with respect to collecting means each remaining trapped between a seat, surrounding a centering rim arranged around said respective passageway and a respective movable pressing plug, mounted at a distal end of said respective supporting means.

3. The device according to claim 2 wherein said pressing plugs are connected to respective spindles driven by handles mounted on crossbars of longitudinal posts of said supporting means, said crossbars being susceptible to be withdrawn from a position facing said respective fine filters when said pressing plugs are not operating.

4. The device according to claim 3 wherein respective protecting filtering walls are fastened to said selector bodies and said supporting means and externally arranged on at least one area of said first and second fine filters larger than a part thereof which remains submerged when they are in said cleaning position, thereby preventing that particles suspended in said fluid enter close to said seats and passageways when said first and/or second line filters are withdrawn for their cleaning, with said supporting means in said cleaning position.

5. The device according to claim 4 wherein said supporting means further comprise a reinforcing cross structure which defines, on one side, a supporting foot on a bottom of said container and which extends by its opposite side, defining a handle which remains emerged when said supporting means are in said working position.

6. The device according to claim 1, wherein in said working position said supporting means are in a substantially horizontal position while in said cleaning position, said supporting means are in a substantially vertical position.

7. The device according to claim 6, wherein said device further comprises locking means arranged for locking said supporting means in said cleaning position.

* * * * *